June 6, 1961 E. SHAIN 2,987,674
FREQUENCY MEASURING APPARATUS
Filed Nov. 18, 1957

INVENTOR:
EDWIN SHAIN,
BY Donald C. Keaveney
HIS ATTORNEY.

United States Patent Office 2,987,674
Patented June 6, 1961

2,987,674
FREQUENCY MEASURING APPARATUS
Edwin Shain, East Syracuse, N.Y., assignor to General Electric Company, a corporation of New York
Filed Nov. 18, 1957, Ser. No. 697,038
5 Claims. (Cl. 324—78)

This invention relates to apparatus utilizing a counter for measuring the frequency of electrical waveforms such as pulses, sine waves, or the like. More particularly, this invention relates to means for improving the accuracy or reducing the ambiguity inherent in such apparatus.

There are many equipments in which it is necessary to count or otherwise determine the frequency or rate of occurrence of electrical waveforms such as sine waves or pulses. Such equipments include, for example, apparatus for measuring the velocity of a projectile, a missile, or other like moving vehicle. Such apparatus commonly utilizes a radar system for reflecting electromagnetic energy from the moving object whose velocity is to be measured. In such a system the frequency shift or magnitude of the Doppler frequency of the return signal then gives a measure of the velocity of the moving object. It has been common practice to square and differentiate this return Doppler frequency signal, to pass the resulting pulses through a gate circuit which is opened for a known predetermined length of time, and to count the number of pulses per unit time interval as a measure of the frequency of the return signal. It is well known that in such apparatus there is an inherent ambiguity of plus or minus one pulse per unit time counting interval which arises from the problem of aligning a gate timing signal with pulses of unknown frequency or rate of recurrence. Of course, this problem is not restricted to velocity measuring apparatus but also arises in any apparatus wherein it is desired to count a number of electrical pulses occurring in a predetermined time interval at an unknown rate or, in other words, to measure the frequency of an electrical signal by gating the signal to a counting device for a predetermined time interval.

It is an object of this invention to provide means for reducing the ambiguity in such apparatus and to thereby improve its accuracy.

It is a further object of this invention to provide a polarity sensitive pulse frequency doubling circuit adapted for use in improving the accuracy of frequency measuring or pulse counting apparatus.

Briefly, in accordance with one aspect of this invention, an electrical signal the frequency of which is to be measured is first passed through a shaping circuit such as to produce one positive-going and one negative-going pulse per cycle of the signal. These pulses are then passed through a positive pulse frequency doubling circuit the output of which consists of two positive-going pulses per cycle of the original signal. This output is passed through a gate circuit and thence to a count-down circuit which divides the pulse rate by two. The output of the count-down circuit is then applied to an indicating counter which indicates the integral number of full cycles counted. The count-down circuit is provided with means to indicate the half-cycle count. It can be shown that the ambiguity of the system is thereby reduced from plus or minus one cycle per unit time interval to plus or minus one-half cycle per unit time interval.

While the novel and distinctive features of the invention are particularly pointed out in the appended claims, a more expository treatment of the invention, in principle and in detail, together with additional objects and advantages thereof, is afforded by the following description and accompanying drawing in which:

Figure 1:
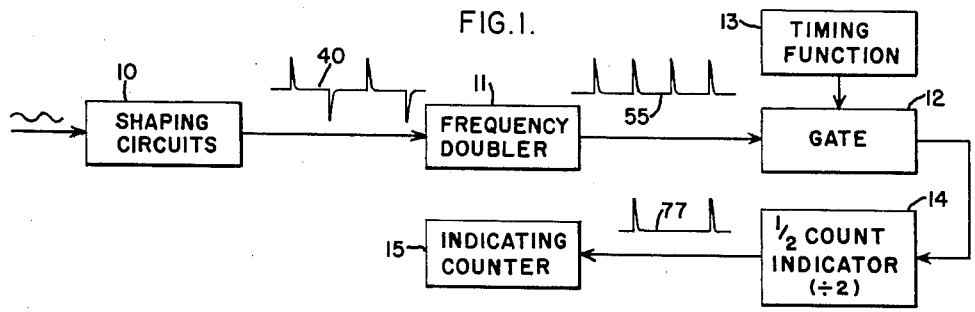
FIG. 1 is a block diagram of the frequency measuring apparatus of the present invention.

Turning now to the drawing, and in particular to FIG. 1 thereof, there is shown a block diagram of a system for measuring the frequency or recurrence rate of an electrical signal such as the sine wave shown applied as an input to shaping circuit 10. The shaping circuits indicated by block 10 are such as to square and differentiate the input applied thereto. Many such circuits are well known in the art and will provide an output signal consisting of one positive-going pulse and one negative-going pulse for each cycle of the sine wave input. In the past it has been the practice to apply this series of pulses directly to a gate circuit which is controlled by some known timing function or signal and to apply the output of the gate circuit to an indicating counter which responds only to the positive-going pulses so as to give a count of the number of cycles of signal which have occurred during the known time period in which the gate was opened.

Figure 3:
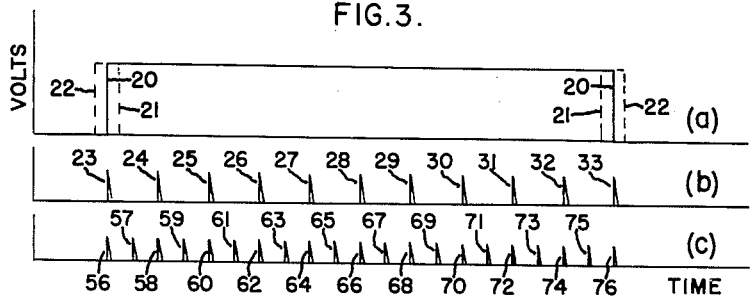
FIG. 3 is a waveform diagram showing time plotted as abscissa against voltage plotted as ordinate for certain waveforms occurring in the operation of the system of FIG. 1.

The ambiguity inherent in this counting process may be readily seen by referring to graphs a and b of FIG. 3. In graph a of FIG. 3 the rectangular solid line waveform 20 represents the timing function or gating pulse which hold the gate open for a known period of time. Assuming for purposes of illustration that the pulse 20 measures one second of duration and that the frequency of the incoming signal is ten cycles per second, then the eleven pulses 23 through 33 shown in graph b of Fig. 3 may coincide with the timing signal 20. Of course, the intervals between each of these pulses, such as the interval between pulse 23 and pulse 24, represents the duration of one cycle of the incoming signal. The case illustrated by the graph is the case in which accurate measurement is most likely but it is also the case which is least likely to occur. Obviously, if the period of the timing signal and the period of the pulse train to be measured are not harmonically related or do not have exact phase coherence, then the ambiguity of plus or minus one pulse is logically or mathematically inherent in the measuring technique. However, even if it happens that the gate is opened exactly at the beginning of a cycle as shown in FIG. 3, it is still very difficult to determine whether the frequency being measured is 9, 10, or 11 cycles per second. That is to say, even in the situation where there is exact phase coherence between the gating signal and the pulses being counted, a very small fraction of a microsecond may determine whether the first and last pulses do or do not pass through the gate circuit. Another way of looking at the matter is to consider that it is impossible to generate a gating signal which is an infinitely precise measure of the nominal time interval. This is illustrated in exaggerated form by the dotted line portions of the graph a in FIG. 3. Thus, if the gating signal is slightly too long in duration, as illustrated by the dotted waveform 22, then all eleven of the pulses 23 through 33 will be passed by the gate to the counter which will indicate eleven cycles per second rather than the actual frequency of ten cycles per second. On the other hand, if the gating pulse is a trifle too short in duration as indicated by the dotted waveform 21, then only the nine pulses 24 through 32 will be passed by the gate, and the counter will indicate only nine cycles per second.

In certain types of apparatus this degree of error may exceed the permissible tolerances of the system requirements. In such apparatus the system of FIGS. 1 and 2 may be used to improve the accuracy of the count. In FIG. 1, as noted above, a sine wave the frequency of which is to be measured is shown applied as an input to shaping circuits 10. The shaping circuits are such as to produce a train of square or rectangular waves of alternating polarity from the sine wave and to differentiate these rectangular waves so as to produce a positive-going pulse at the leading edge and a negative-going pulse at the trailing edge of each wave. There will thus be one positive-going pulse at the beginning of each cycle of the sine wave and one negative-going pulse at the midpoint or 180° phase point of each cycle. Shaping circuit 10 may consist of any conventional squaring and differentiating circuits. The above described bipolar output signal from the shaping circuit 10 is applied, as shown in FIG. 1, to a polarity sensitive frequency doubler or positive pulse rate doubler 11.

Figure 2:
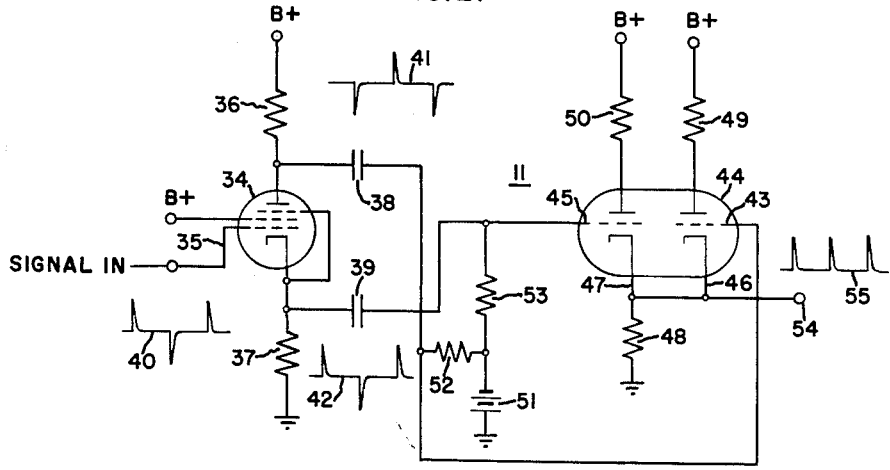
FIG. 2 is a schematic circuit diagram of the frequency doubling circuit used in the system of FIG. 1.

A schematic circuit diagram of frequency doubler 11 is shown in FIG. 2. The bipolar output signal of shaping circuit 10 is applied as an input to the control grid 35 of a pentode 34 which is connected as a phase splitter. Pentode 34 has a plate load resistor 36 and a cathode load resistor 37. Plate and screen grid potentials are supplied to penthode 34 from any convenient sources of B+ voltage as shown. An input signal such as the waveform 40 applied to grid 35 will appear across the plate load resistor 36 as a phase inverted output signal as illustrated by the waveform 41. This plate output signal 41 is applied through a coupling condenser 38 to the control grid 43 of a dual-triode tube 44 which is connected as a pulse selector. On the other hand, the train 40 of input pulses to pentode 34 will appear across its cathode load resistor 37 without any phase inversion as shown by the waveform 42. The pulses 42 comprising the cathode output of phase splitter 34 are applied through a coupling condenser 39 to the control grid 45 of the other half of dual-triode 44. It will be noted that the plate and cathode output waveforms 41 and 42 from phase splitter 34 are 180° out of phase. That is to say, a positive pulse applied to the grid of pentode 34 will appear as a negative pulse in the plate output circuit and as a positive pulse in the cathode output circuit. Similarly, a negative pulse applied to the grid of pentode 34 will appear as a positive pulse in the output circuit of phase splitter 34 and as a negative pulse in the cathode output circuit. Hence, any pulse, whether positive or negative, which is applied as an input to pentode 34 will appear as a positive output pulse either in the plate or in the cathode output circuit of the pentode.

The cathodes 46 and 47 of dual-triode 44 are both connected to a common cathode load resistor 48 across which an output may be derived as at terminal 54. B+ power is supplied to the plates of the two sections through plate resistors 49 and 50 respectively. Both sections of the dual-triode 44 are operated at cutoff bias. This bias is derived from a battery or other source of fixed potential 51 and is applied to grid 43 via a resistor 52 and to grid 45 via a resistor 53. Because the two triode sections of the tube 44 are operating at cutoff; only positive pulses on the grids 43 and 45 will be passed through the tube to appear as positive pulses across common cathode resistor 48. Since either a positive or a negative pulse applied as an input to pentode 34 will produce a positive pulse at one or the other of the grids 43 or 45 of the pulse selector dual-triode 44, the output of the stage at terminal 54 will be a series of positive pulses occurring at twice the Doppler frequency, that is, at twice the frequency of the positive pulses applied to grid 35 of pentode 34. This output is shown as waveform 55 in FIGS. 1 and 2.

The train of pulses 55, which is shown in greater detail in graph c of FIG. 3 as the individual pulses 56 through 76, is applied as an input to gate circuit 12. The gate circuit 12 may comprise any conventional circuit which will translate a positive-going input signal to its output only when a timing signal, such as the waveform 20 shown in graph a of FIG. 3, is applied to it. This timing signal or function is derived from any convenient generator or timing function source 13. The output from gate 12 is applied to a one-half count indicator 14. Indicator 14 may consist of a bistable or "flip-flop" circuit which will provide one output pulse in response to every other input pulse applied to it and which is provided with visual or other means to indicate which of its two stable states it is in at any given time. Output pulses from the half count indicator 14 are applied to an indicating counter or bank of decades 15 in which the integral portion of the measure of the frequency of the original signal is stored and from which it may be read out by any convenient means.

Referring to graph c of FIG. 3 it will be noted that by virtue of the inclusion of frequency doubler 11 in the system of FIG. 1 the input to gate 12 for a ten cycle per unit timing interval signal consist of twenty-one positive pulses rather than eleven positive pulses. Again, of course, the first and last pulses 56 and 76, respectively, may or may not be transmitted through gate 12 depending upon the exactness of their coincidence with the timing function signal applied to gate 12. That is to say, the output from gate 12 may be either 19, 20, or 21 pulses depending upon the coincidence and phase relation to the timing signal. These pulses are applied to the one-half count indicator 14 which is initially set in a predetermined one of its two stable states to indicate a zero count. If nineteen pulses have been transmitted from the gate, indicator 14 will emit nine pulses to indicating counter 15 in response to the first eighteen of these pulses thus leaving the half count indicator in its zero indicating state. The remaining or nineteenth pulse will place bistable circuit 14 in its other stable state to indicate a one-half count or odd pulse. Thus, the indicating counter 15 will show nine cycles and the half count indicator 14 will show one-half cycle giving a total count of nine and one-half cycles per unit time interval. If gate 12 passes twenty pulses, the half count indicator will emit ten pulses to indicating counter 15 and will itself be left in its zero state indicating no half cycle count. This, the most probable case, will provide a reading of exactly ten cycles. On the other hand, if gate 12 passes twenty-one pulses, then the half count indicator 14 will transmit ten pulses to indicating counter 15 and will itself indicate the odd or last pulse giving a total count of ten and one-half cycles.

It is apparent that taking an input signal of ten cycles per unit timing interval as an example, the system of FIG. 1 will provide a frequency measure or count which is in error by at most plus or minus one-half cycle rather than by plus or minus one full cycle. Of course, it will be understood that at the expense of somewhat more equipment, the principle of the present invention could be extended to achieve even greater degrees of accuracy by using a plurality of frequency doubler circuits in cascaded relationship. Thus, the output of frequency doubler 11 could itself be used to trigger a multivibrator having a rectangular output which is in turn differentiated and applied to another frequency doubling circuit such as the circuit 11 before being applied to gate 12. If this is done, of course, the signal passed through the gate is at four times the frequency of the original signal and two cascaded half count indicators should be used prior to integral indicating counter 15. One of these half count indicators will still read half cycles while the other will indicate quarter cycles. The ambiguity will thus be reduced to plus or minus one-quarter cycle per unit timing interval. Multiplying the original frequency by eight with three doublers will give a reading correct to plus or minus one-eighth cycle and so on. Any desired number of cascaded stages can be similarly used.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What I claim and desire to secure by Letters Patent of the United States is:

1. In an electrical signal frequency measuring apparatus of the type including a wave-shaping circuit connected to produce an output comprising one positive-going pulse and one negative-going pulse per cycle of said signal the frequency of which is to be measured, a pulse counting circuit, and a gate circuit connected to apply only wave-shaping circuit output pulses of one predetermined polarity to said counting circuit exclusively during the application of a timing signal to said gate circuit, the improvement comprising, means interposed in circuit between said wave-shaping circuit and said gate circuit to double the pulse rate of pulses of one predetermined polarity applied as an input to said gate circuit, and means interposed in circuit between said gate circuit and said counting circuit to divide the pulse rate of the output pulses from said gate circuit by two and to indicate any remainder of said division.

2. Apparatus for measuring the frequency of an electrical signal comprising, means to derive a first waveform comprising one electrical pulse of predetermined polarity per cycle of said signal; means to derive from said first waveform a second waveform consisting of two pulses of the same polarity per cycle of said signal; means to apply said second waveform to pulse counting means only during a predetermined time interval, said pulse counting means comprising a half count indicator to which said second waveform is applied and an integral count indicator to which the output of said half count indicator is applied, said half count indicator comprising a bistable circuit which emits one output pulse for every two input pulses applied to it and which is provided with means to indicate which of its two stable states it is in at any given time.

3. Apparatus for measuring the frequency of an electrical signal having at least one pulse of predetermined polarity per cycle of said signal comprising, pulse counting means, frequency doubling means to derive from said signal a waveform comprising two pulses of the same polarity per cycle of said signal, a gate circuit connected to apply said waveform to said pulse counting means only during the application of a timing signal to said gate circuit, said pulse counting means comprising a half count indicator to which the output of said gate circuit is applied and an integral count indicator to which the output of said half count indicator is applied, said half count indicator comprising a bistable circuit connected to emit one output pulse for every other input pulse applied to it and being provided with means to indicate which of its two stable states it is in at any given time.

4. Apparatus as in claim 3 wherein said frequency doubling means comprises a first signal translating device connected as a phase splitter, means to apply said electrical signal to said signal translating device, said signal translating device having a first output signal which is in phase with said electrical signal and a second output signal which is 180° out of phase with said electrical signal; a second signal translating device connected to pass only signals of one predetermined polarity, means to apply first and second output signals of said first signal translating device to said second signal translating device and means to derive a composite signal from said second signal translating device.

5. Apparatus for measuring a characteristic of an electrical signal comprising, means to derive a first wave form comprising one pulse of predetermined polarity per cycle of said signal, means to derive from said first wave form a second wave form consisting of two pulses of the same polarity per cycle of said signal, pulse-counting means, means to apply said second wave form to said pulse-counting means only during a predetermined time interval, said pulse-counting means comprising a half-count indicator and an integral-count indicator, said half-count indicator responsive to every two input pulses appearing in said applied second wave form for applying one output pulse to said integral-count indicator, and means for utilizing the output of said half-count indicator and said integral-count indicator to indicate the frequency of said electrical signal.

References Cited in the file of this patent

UNITED STATES PATENTS

| | | |
|---|---|---|
| 2,414,479 | Miller | Jan. 21, 1947 |
| 2,575,759 | Higinbotham et al. | Nov. 20, 1951 |
| 2,721,938 | Trousdale | Oct. 25, 1955 |
| 2,824,958 | Dunn | Feb. 25, 1958 |
| 2,828,468 | Ball et al. | Mar. 25, 1958 |
| 2,839,725 | Haas | June 17, 1958 |

FOREIGN PATENTS

| | | |
|---|---|---|
| 783,528 | Great Britain | Sept. 25, 1957 |